United States Patent [19]

Matsumoto

[11] Patent Number: 5,710,985
[45] Date of Patent: Jan. 20, 1998

[54] WIRELESS PORTABLE TELEPHONE HAVING ANTENNA RETRACTION DETECTION MEANS

[75] Inventor: Kiyoshi Matsumoto, Amagasaki, Japan

[73] Assignee: Mitsubishi Denki Kabushiki Kaisha, Tokyo, Japan

[21] Appl. No.: 383,103

[22] Filed: Feb. 3, 1995

[30] Foreign Application Priority Data

Feb. 17, 1994 [JP] Japan .................................. 6-020685

[51] Int. Cl.⁶ .................................................. H04B 1/38
[52] U.S. Cl. ................................. 455/89; 455/226.4
[58] Field of Search ............................ 455/67.3, 67.7, 455/89, 90, 97, 226.4; 379/58

[56] References Cited

U.S. PATENT DOCUMENTS

| | | | |
|---|---|---|---|
| 4,415,770 | 11/1983 | Kai et al. | 179/2 |
| 4,506,266 | 3/1985 | Mizuno et al. | 343/715 |
| 5,193,216 | 3/1993 | Davis | 455/67.7 |
| 5,321,738 | 6/1994 | Ha | 379/58 |
| 5,396,651 | 3/1995 | Nitardy | 455/54.2 |

OTHER PUBLICATIONS

Mitsubishi International Corp., Model 4000 Portable Cellular Telephone (Owner's Manual), pp. cover, index, 8–9 & 56–57.

*Primary Examiner*—Edward F. Urban
*Attorney, Agent, or Firm*—Rothwell, Figg, Ernst & Kurz

[57] ABSTRACT

Upon the reception of a page message from a base station (step S1-1), a wireless portable telephone transmits to the exterior a page response which is a response to the page message (step S1-2). If, when transmitting the page response, a data transmission error has been detected (step S1-3), then a predetermined warning tone is generated (step S1-4). Thus, by virtue of this warning tone, the user of the wireless portable telephone can draw out an antenna or move to a place in which the electric field is in a good condition.

7 Claims, 8 Drawing Sheets

EMBODIMENT 3 AND 4

WIRELESS PORTABLE TELEPHONE HAVING ANTENNA RETRACTION DETECTION MEANS

BACKGROUND OF THE INVENTION

1. Field of the Invention

The present invention relates generally to a wireless telephone system, and more particularly to a wireless portable telephone for transmitting and receiving data to and from a base station.

2. Description of the Related Arts

With the development of communication techniques, a wireless telephone system is now widely utilized. Since in the conventional wireless telephone system, the condition of the data transmission or reception greatly affects the communication, its wireless portable telephone is equipped with functions for giving various warnings to the user. The conventional wireless portable telephone often includes a function for generating a warning tone such as an intercept tone or a busy tone depending on circumstances. The intercept tone is a warning tone to be output when a call is placed, but a data stream transmitted from a base station is not receivable (no service). Also, the busy tone is a warning tone to be output when there is no free channel upon a placing a call.

Figure 7:
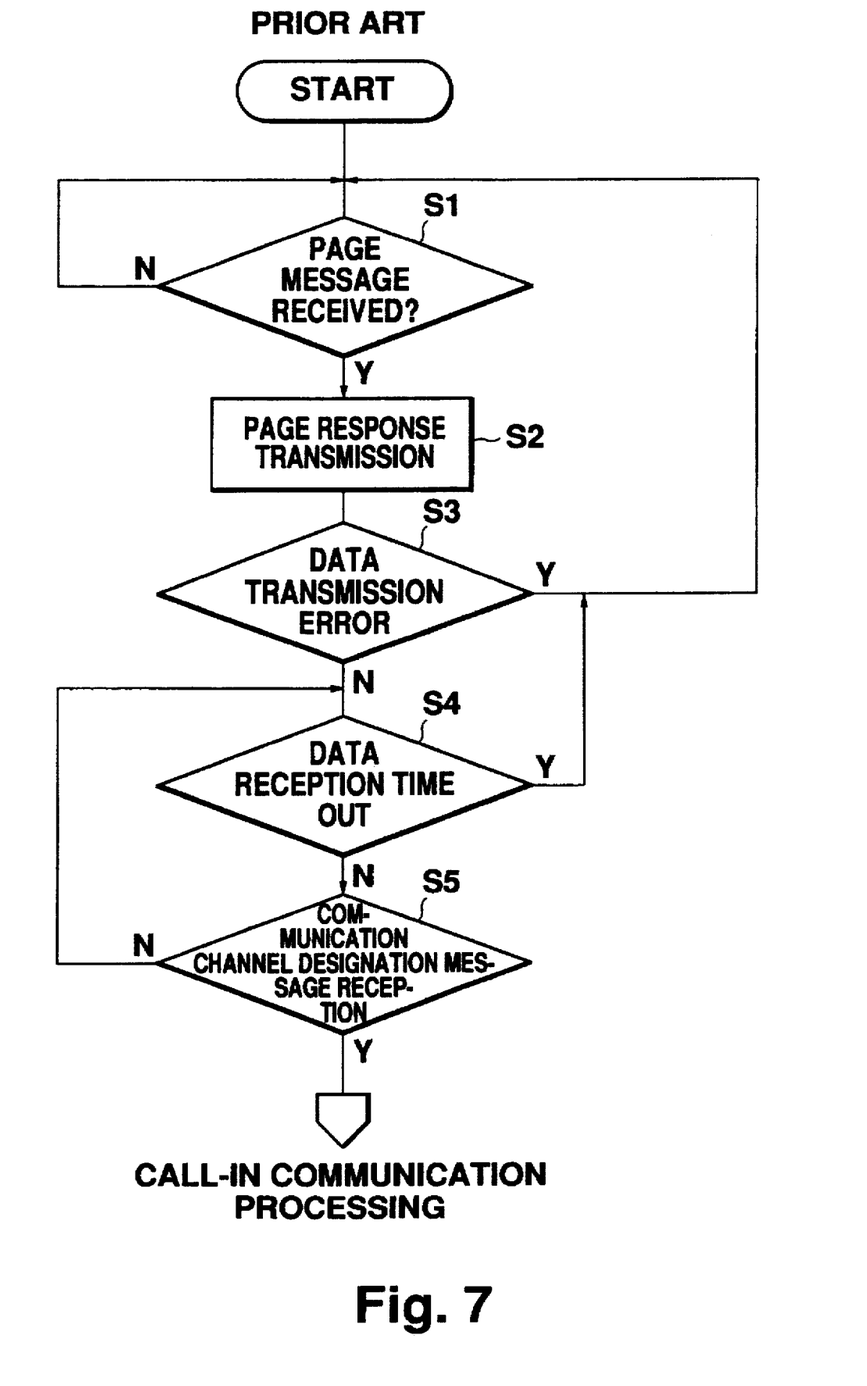
FIG. 7 is a flowchart depicting the action of a conventional wireless portable telephone.

Shown in FIG. 7 is a flowchart illustrating the action of a conventional wireless portable telephone. Also depicted in FIG. 8 is an explanatory diagram of a message transmission/reception procedure representing the exchange of messages between the base station and a wireless portable telephone when receiving a call.

Figure 8:
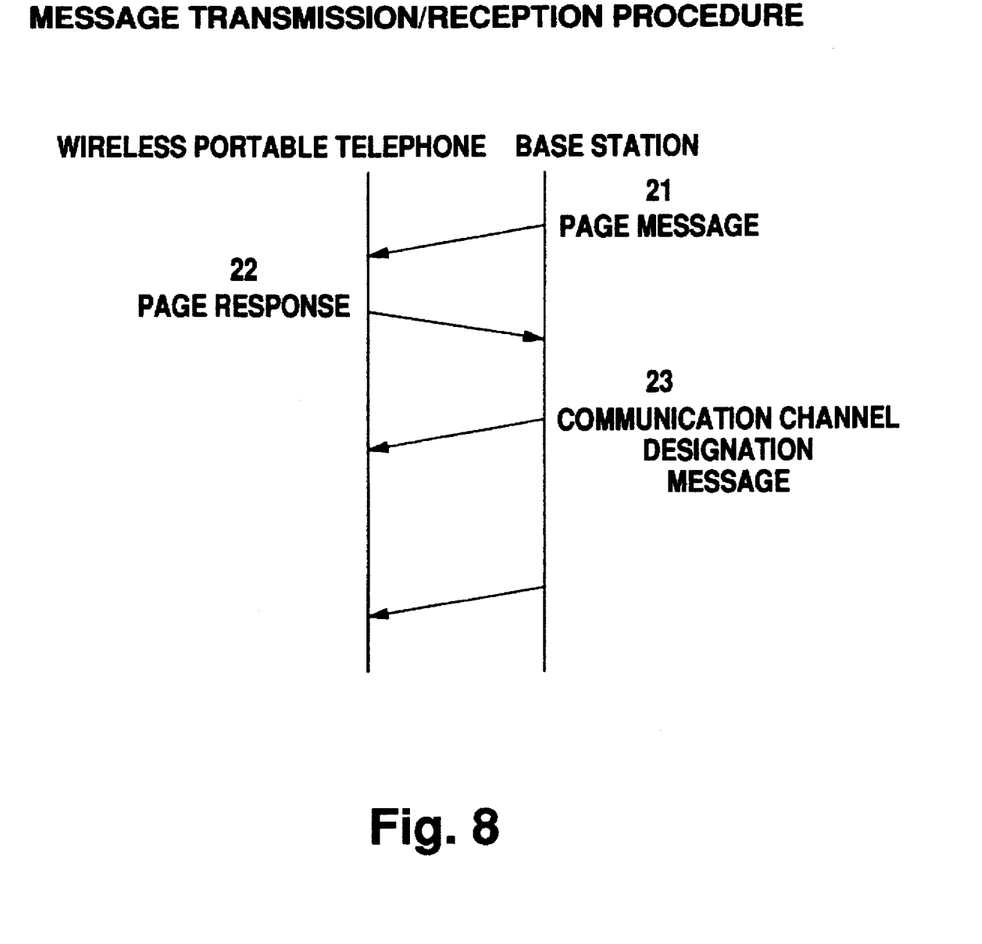
FIG. 8 is an explanatory diagram showing the procedure for transmitting and receiving messages between the wireless portable telephone and a base station.

Once a request for line connection occurs at the base station, the latter sends out a page message 21 to the wireless portable telephone as shown in FIG. 8. On the other hand, in step S-1 shown in FIG. 7, the wireless portable telephone is constantly monitoring whether the page message 21 has been received or not. Then, if the page message 21 addressed to its own station has been received, the processing advances to step S2.

In step S2 a page response 22, which is a response signal to the page message 21, is transmitted.

On the occasion of the transmission of the page response 22 in step S2, it is detected whether a transmission error has occurred or not in step S3. If any error has taken place, then the processing returns to step S1.

Whether a data transmission error has occurred or not is detected as follows. That is, in the wireless telephone system, data is at all times transmitted in a predetermined format from the base station. This format is provided with busy/idle bits (hereinafter referred to as B/I bits) indicating whether respective channels are busy or idle. Each B/I bit, when "1", indicates that the corresponding channel is idle, and when "0" indicates that the channel is busy.

After the initiation of the data transmission, the wireless portable telephone continues to check the B/I bits. If one B/I bit has changed from idle into busy, that is, "1" into "0" during the period in which the number of bits to be transmitted is 56 to 104, the data transmission is judged to be successful. If no change has been detected in the B/I bits during this period, a data transmission error will be considered to have occurred. Typically, when there has been no change in the B/I bits during the period, another data transmission is performed after a given time interval. Namely, a predetermined number of retrials are to be performed. Then, if no change has been detected during the predetermined period of retrials, a data transmission error is finally judged to have occurred.

In the wireless telephone system, in this manner, the base station, when receiving data through a given channel from the wireless portable telephone, changes the B/I bit from "1" into "0" during the period receiving the 56th to 104th data. Then, if this change is not observed from the wireless portable telephone, it is possible to judge on the side of the wireless portable telephone that the transmission from the wireless portable telephone has failed.

Providing that no transmission error has occurred in step S3, then it is judged in step S4 whether data reception can be performed or not in a given period of time. More specifically, if in step S4 a communication channel designation message has not been received regardless of a lapse of a given time after the transmission of the page response 22, then the processing returns to step S1 as in the case of the data transmission error described above.

On the contrary, if in step 4 data reception has been made within a given time, it is detected in step S5 whether the received data is a communication channel designation message or not. If so, the processing advances to a predetermined call-in communication processing. Reversely, if not, the processing in step S4 is executed again.

Thus, with the conventional wireless portable telephone receiving the data stream from the base station providing service, if data transmitted from the wireless portable telephone does not reach the base station, the user was unable to realize grasp such a condition. For this reason, from the user's viewpoint, even during so-called service there were a few cases in which the location registration or call-in of the wireless portable telephone failed.

The conventional wireless portable telephone involves a problem that it is more difficult for up data (data routed from the wireless portable telephone to the base station) than down data to reach its object, since the transmission power of the wireless portable telephone is less than that of the base station.

As a result of this, for example, in the mobile telephone system, a verification signal from the wireless portable telephone will not reach the base station though the call-in signal from the base station can be received, whereupon a line connection may be adversely prevented from being established. Such inconveniences may very often occur in the portable telephone having less transmission power, in particular, at a place far from the base station, when the antenna is retracted or when the wireless portable telephone is put in a bag.

In the conventional wireless portable telephone, the user was unable to recognize that it was a long distance to the base station and so on, leaving the line connection unestablished since the verification signal is not allowed to reach the base station irrespective of the reception of the call-in signal. The same applies to the case where the antenna remains retracted or the body remains placed in a bag.

The present invention was conceived to overcome the above deficiencies. The object of the invention is to improve the line connection rate, when an up signal from a wireless portable telephone does not reach the base station, by giving warning to urge the user to take out the wireless portable telephone from a bag etc., draw out the antenna, or move to a place where the electric field is in good condition.

SUMMARY OF THE INVENTION

In order to overcome the above problems, the present invention provides a wireless portable telephone for use in a wireless telephone system, comprising a data transmission means; a data transmission monitor means for detecting whether a data transmission by the data transmission means has succeeded or not; and a warning means for issuing warning to the exterior when the data transmission monitor means detects that the data transmission by the data transmission means has failed.

In order to remedy the above problems, the present invention provides a wireless portable telephone for use in a wireless telephone system, comprising a data transmission means; a data transmission monitor means for detecting whether a data transmission by the data transmission means has succeeded or not; an antenna section; an antenna retraction monitor means for detecting whether the antenna section is retracted or not; and a warning means for issuing a warning to the exterior when the data transmission monitor means detects that the data transmission by the data transmission means has failed and the antenna retraction monitor means detects that the antenna section is not retracted.

In order to solve the above problems, the present invention provides a wireless portable telephone for use in a wireless telephone system, comprising an antenna section; an antenna retraction monitor means for detecting whether the antenna section is retracted or not; and a warning means for issuing a warning to the exterior when the antenna retraction monitor means detects that the antenna section is retracted upon the reception of a call-in signal.

To remedy the above disadvantages, in the wireless portable telephone of the present invention, the data transmission monitor means includes detection means for judging that the data transmission has failed when no response bit appears among a data stream from a base station within a predetermined period of time from when the data transmission means sends out data.

To solve the above disadvantages, in the wireless portable telephone of the present invention, the warning means includes a warning tone generation means for generating a predetermined warning tone.

Preferably, the warning means of the present invention issues a warning to the exterior when the data transmission has failed.

Preferably, the warning means issues a warning to the exterior when the data transmission has failed and the antenna section is not retracted.

Preferably, the warning means issues a warning to the exterior when the antenna section is retracted upon the reception of a call-in signal.

Also, the data transmission monitor means of the present invention may provide a warning to the exterior when no response bit appears among a data stream from the base station within a predetermined period of time after the data has been transmitted.

Preferably, the warning means of the present invention generates a predetermined warning tone for issuing warning to the user.

Preferably, a warning message display means displays a predetermined warning message for the user.

Further features and advantages of the wireless portable telephone according to the present invention will become apparent from the following description with reference to the annexed drawings, given purely by way of non-limitative example.

DESCRIPTION OF THE PREFERRED EMBODIMENTS

Preferred embodiments of the present invention will now be described with reference to the accompanying drawings.

Embodiment 1

Figure 1:
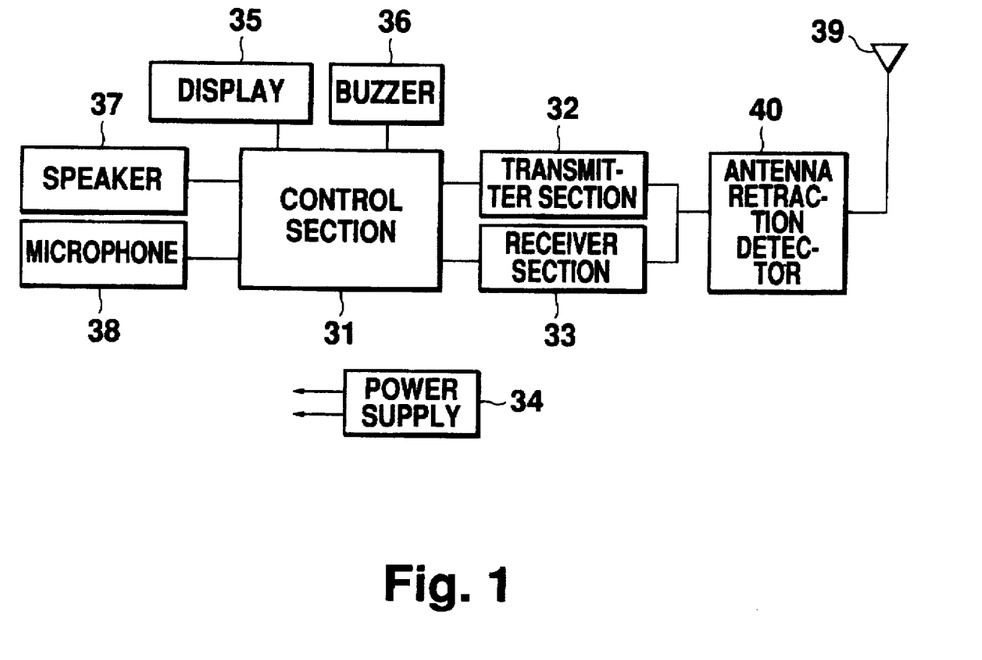
FIG. 1 is a block diagram depicting a configuration of a wireless portable telephone in accordance with a preferred embodiment of the present invention.

FIG. 1 is a block diagram depicting a configuration of a wireless portable telephone in accordance with this embodiment. As shown in FIG. 1, the wireless portable telephone comprises a control section 31 for controlling the action thereof, a transmission section 32 for transmitting data, and a receiving section 33 for receiving the data. The wireless portable telephone further comprises a display 35 for displaying a predetermined message, and a buzzer 36 for giving a predetermined warning to a user.

This embodiment is characterized in that a case where a so-called up signal does not reach the base station as described above is detected, whereupon a predetermined warning is given to a user by means of a buzzer 36.

The wireless portable telephone of this embodiment is also provided with a speaker 37 and a microphone 38 for conversation in the same manner as the conventional wireless portable telephones. It is further provided with an antenna 39 and an antenna retraction detector 40 for detecting the state in which the antenna is retracted.

This embodiment is characterized in that the retraction of the antenna is detected by the antenna retraction detector 40, allowing the buzzer 36 to give the user a warning to draw out the antenna, if the antenna is retracted, when the base station is not reached by a so-called up signal as described above. A power source 34 serves to supply electric power to the elements of the wireless portable telephone.

When a demand for line connection originates from the base station, the latter sends out a page message 21 to the wireless portable telephone. Then, the wireless portable telephone continuously monitors page messages 21 in the same manner as the prior art to thereby examine whether a page message 21 directed to its own station has been received or not. Such action corresponds to step S1-1 of the flowchart shown in FIG. 2.

Figure 2:
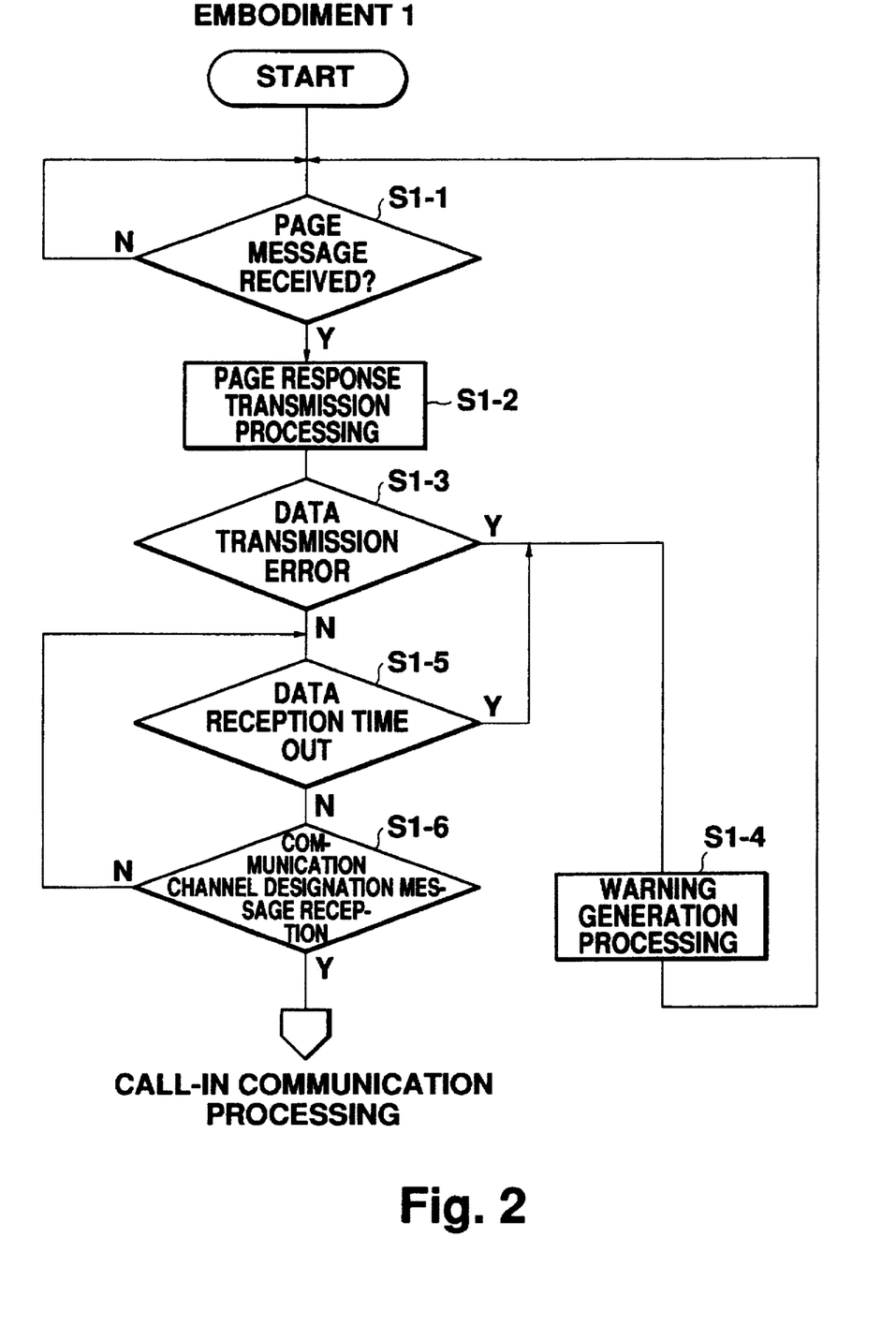
FIG. 2 is a flowchart illustrating the action of a wireless portable telephone in accordance with embodiment 1.

If it is judged in the step S1-1 that the page message directed to its own station has been received, then a page response 22 is transmitted to the base station in step S1-2.

Then, it is judged in step S1-3 whether a transmission error has occurred or not in step S1-2. This judgment is made in accordance with the same procedure as in the conventional wireless portable telephone described hereinbefore.

If it is judged in step 1-3 that a data transmission error has occurred, then the processing advances to step S1-4 in which the buzzer 36 or the speaker 37 informs the user that a transmission message sent out from the wireless portable telephone has not reached the base station.

This embodiment is characterized in that when a data transmission error has taken place it is possible for such a warning tone to inform the user that no response was made in spite of the call from the base station. After the completion of the processing in step S1-4, the processing returns to the step S1-1 waiting for the reception of a page message.

Providing that no data transmission error has been detected in step S1-3, the processing advances to step S1-5 in which if a communication channel designation message is not received within a specified time after the data transmission, then the processing will proceed to step S1-4 as in step S1-3 to give a predetermined warning to the user. On the contrary, if in step S1-5 the receipt of the transmitted data is received within the specified time, the processing will advance to step S1-6.

It is judged in step S1-6 whether the data thus received is a communication channel designation message or not. If so, a call-in communication processing is performed. On the contrary, unless the received data is a communication channel designation message, the processing returns to step S1-5.

According to this embodiment, in this manner, when having failed in data transmission to the base station or when having received no response to the data successfully transmitted to the base station, the buzzer 36 or the speaker 37 will inform the user that an error has occurred. Thus, its warning tone will enable the user to take measures for improvement such as moving to an area in which the state of the electric field is good, drawing out its antenna, or taking out the apparatus from the user bag.

Embodiment 2

In embodiment 1 described above, a predetermined warning tone is used to inform the user that a data transmission error has occurred. Alternatively, the user may be informed of the data transmission error by means of the display 35 for displaying ordinary messages.

Figure 3:
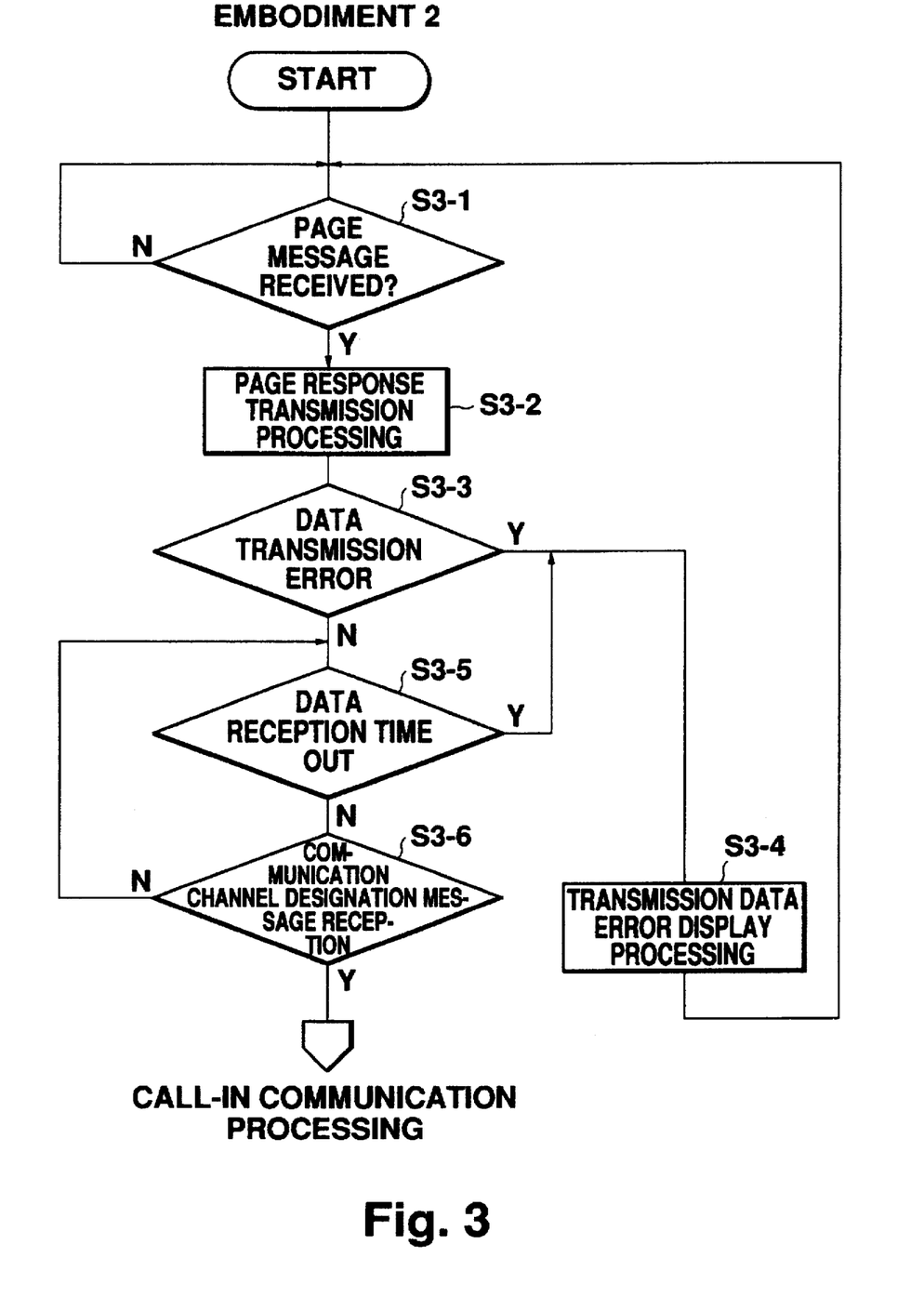
FIG. 3 is a flowchart illustrating the action of a wireless portable telephone in accordance with embodiment 2.

FIG. 3 is a flowchart illustrating the action performed when using the display 35 to inform the user of the data transmission error. The flowchart shown in FIG. 3 is substantially the same as that shown in FIG. 2 described above. More specifically, steps S3-1, S3-2 and S3-3 completely correspond in processing to the steps S1-1, S1-2 and S1-3, respectively, in FIG. 2.

Embodiment 2 is characterized by step S3-4 in which, unlike step S1-4 in FIG. 2, when a specified data transmission error has occurred, the occurrence of the error is displayed in the form of a predetermined error message on the display 35, thereby allowing the user to be informed of the error.

Thus, by informing the user that an error has occurred by means of an error message appearing on the display 35 instead of the warning tone, it is possible for the user to easily judge the occurrence of an error, for example, even in a place where a tone is unfavorable.

Embodiment 3

In embodiment 2 described above, the user was constantly informed of a data transmission error, if one occurred, in the form of an error message. However, it is often actually very difficult to move to a place where the state of the electric field is good. It is therefore typically possible for the user only to draw out the antenna when it is retracted.

Figure 4:
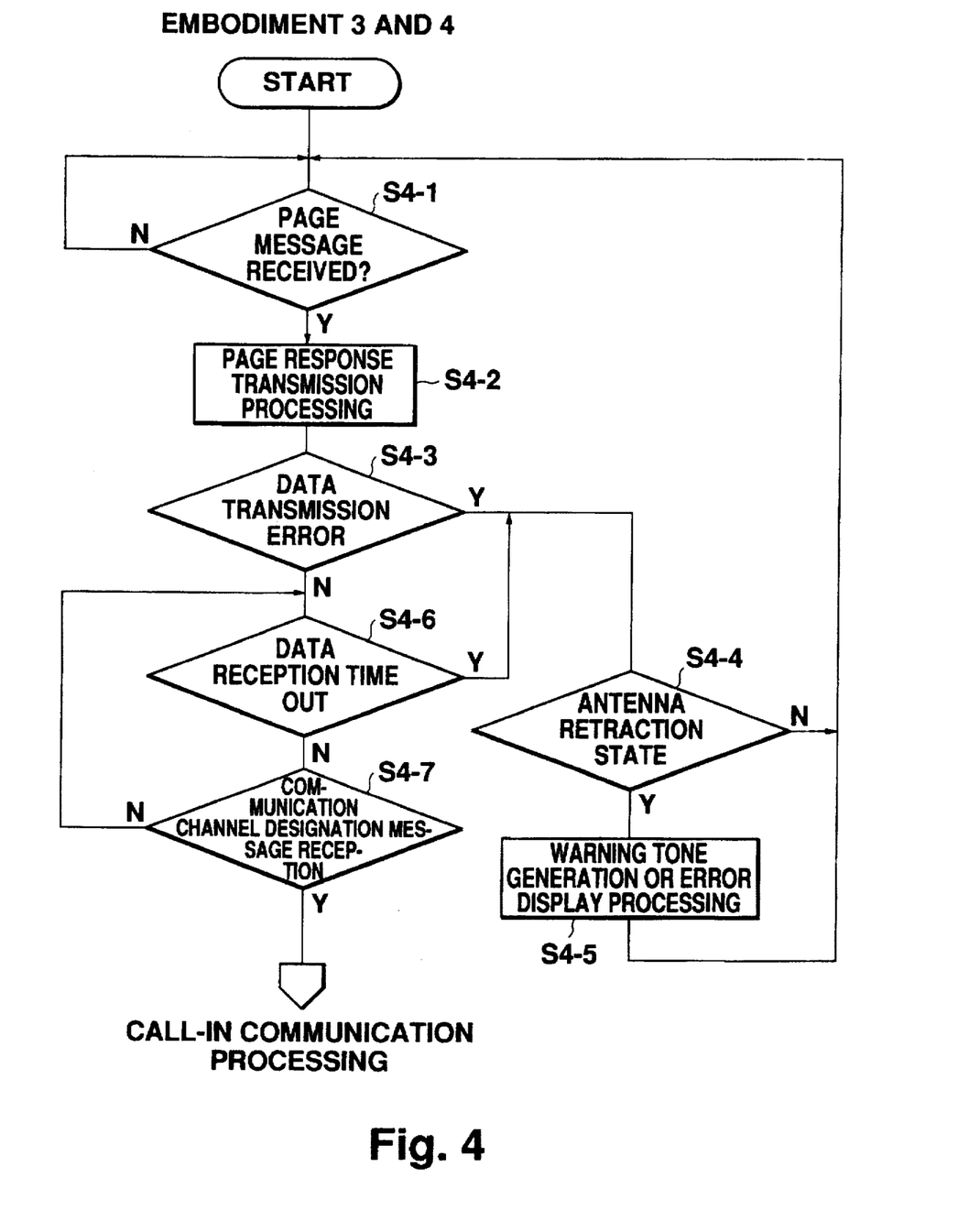
FIG. 4 is a flowchart illustrating the action of a wireless portable telephone in accordance with embodiments 3 and 4.

Thus, embodiment 3 allows the warning tone to be generated only when the antenna is being retracted. FIG. 4 is a flowchart of the action in which only when the antenna is being retracted can the user can receive a warning that a data transmission error has occurred. The flowchart shown in FIG. 4 is substantially the same as that in FIG. 2 described above. More specifically, steps S4-1, S4-2 and S4-3 illustrated in FIG. 4 completely correspond in processing to the steps S1-1, S1-2 and S1-3 in FIG. 2.

Embodiment 3 is characterized in that it is checked whether the antenna is retracted or not in step S4-4 previous to the generation of a warning tone in step S4-5 when a data transmission error has taken place. If the antenna is not retracted, then the processing returns to the first step S4-1 without giving a warning to the user.

Thus, the warning tone is permitted to be generated only in the case where the user can actually cope with it. Accordingly, with the generation of the warning tone, the user can draw out the antenna to ensure a better receiving condition.

Embodiment 4

Upon the detection of a data transmission error with the antenna being retracted, in the above embodiment 3, a warning tone was generated by the buzzer 36 or the speaker 37 to inform the user that an error has occurred. However, the display 35 may be alternatively used to display that an error has occurred as in embodiment 2. Thus, in this embodiment, the user is informed of the occurrence of an error by means of the display 35 instead of the generation of a warning tone.

A flowchart depicting the action of a wireless portable telephone according to embodiment 4 is fundamentally the same as that of embodiment 3 shown in FIG. 4 except that in the step S4-5 the generation of a warning tone is substituted by the display 35 displaying the occurrence of an error. This display is represented as "error display" in FIG. 4.

Embodiment 5

The above embodiment 3 and 4 permit the generation of a warning tone or an error display to be performed only when the antenna is retracted and a data transmission error has occurred. In other words, the generation of a warning tone or an error display are not to be implemented as long as the antenna is drawn out even though a transmission error has occurred. This is due to a conception that the generation of a warning tone or an error display should be suppressed to a minimum.

However, if different warning tones are generated depending on whether the antenna is retracted or not when a data transmission error has occurred, the user will be informed of not only the occurrence of an error but also whether the antenna is retracted. The embodiment 5 enabled distinct warning tones to be generated depending on whether the antenna is retracted or not upon the detection of a data transmission error.

A feature of this embodiment lies in distinct warning tones generated depending on the state of the antenna being either retracted or drawn out, whereby the user can be informed instantly of whether the antenna must be drawn out, or of whether a movement to a place where the electric field is in a good condition is needed.

Figure 5:
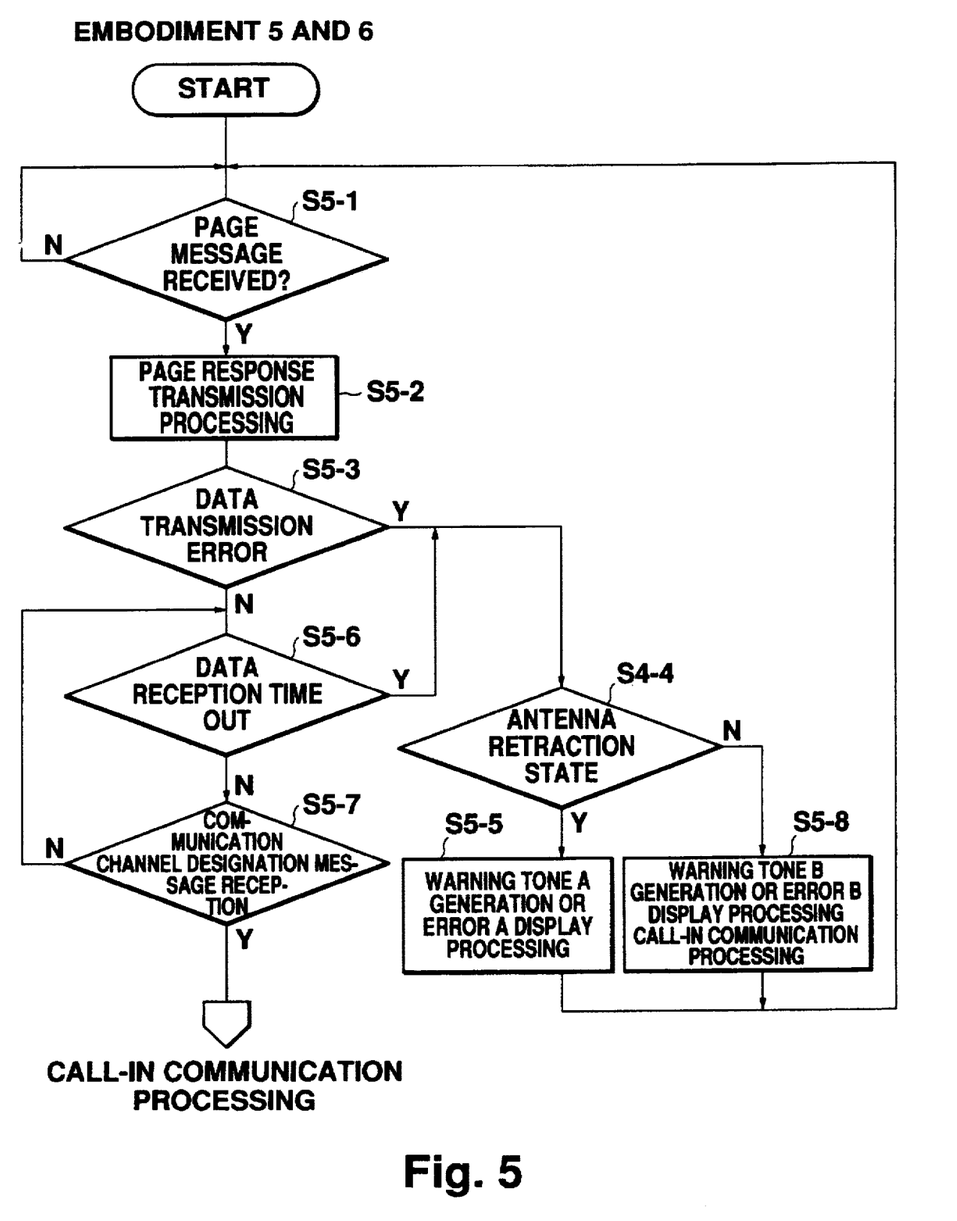
FIG. 5 is a flowchart illustrating the action of a wireless portable telephone in accordance with embodiments 5 and 6.

FIG. 5 is a flowchart illustrating the action of a wireless portable telephone according to the embodiment 5. The flowchart shown in FIG. 5 is substantially the same as that in FIG. 4. More specifically, steps S5-1, S5-2 and S5-3 in FIG. 5 correspond in processing to the steps S4-1, S4-2 and S4-3 in FIG. 4, respectively. Embodiment 5 is characterized in that if the antenna is not retracted in step S5-4 (shown in FIG. 5), the processing proceeds to step S5-8.

Generated in step S5-8 is a warning tone B different from a warning tone A generated in step S5-5 when the antenna is retracted. This will ensure the generation of distinct warning tones A and B depending on whether the antenna is retracted or not when a data transmission error has occurred whereby the user can be informed of both the occurrence of an error and whether the antenna is retracted.

It is to be appreciated that after the generation of the warning tone B in step S5-8, the processing returns to step S5-1 in the same manner as step S5-5.

Embodiment 6

Although in the above embodiment 5 two distinct warning tones were generated depending on whether the antenna is retracted or not, two types of error displays may be employed instead of the warning tones. Preferably, in this case, the warning tones A and B are respectively substituted by, for example, error displays A and B. This will enable embodiment 6 to present the same function and effect as those of the above embodiments 2 and 4.

Embodiment 7

Figure 6:
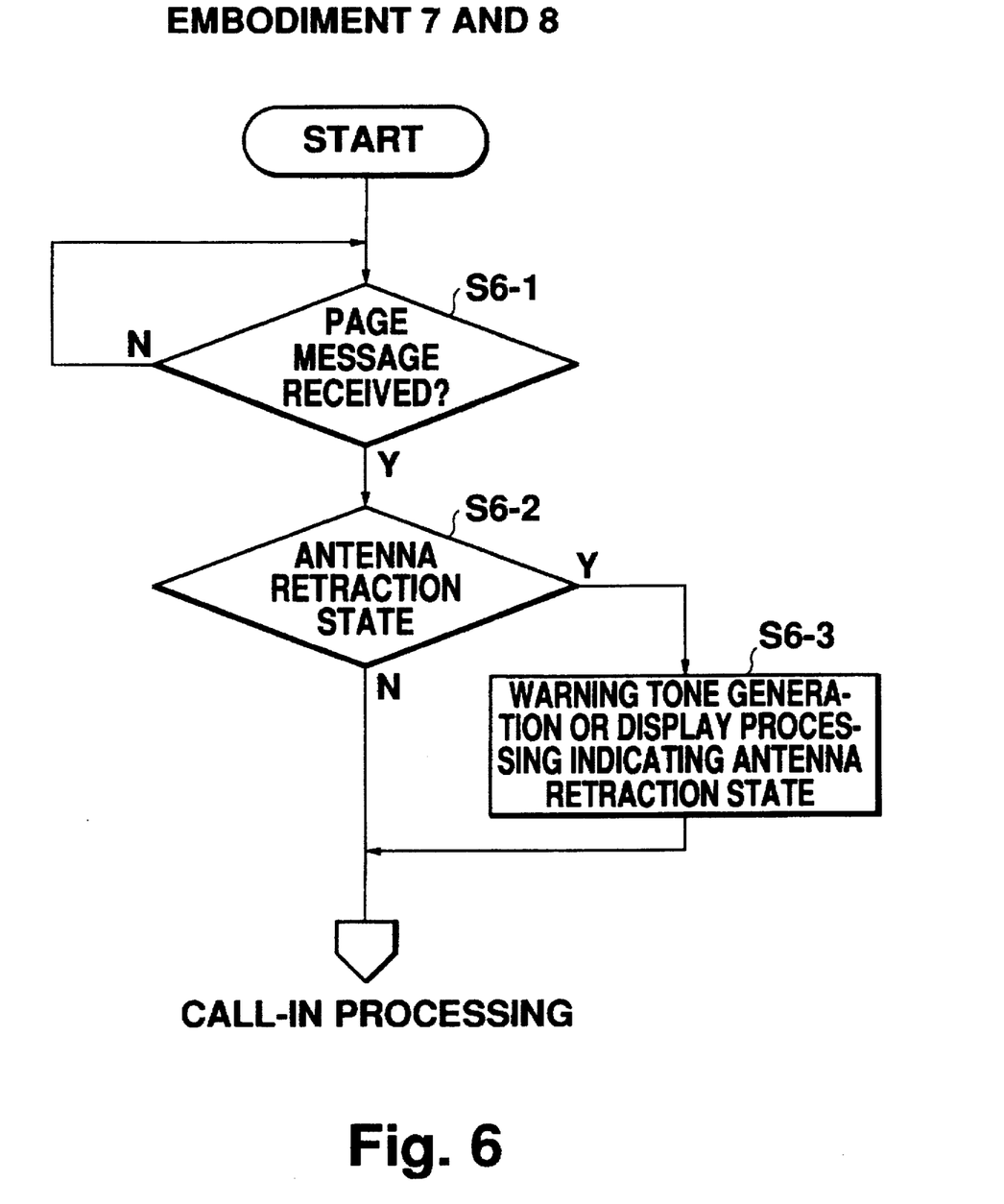
FIG. 6 is a flowchart illustrating the action of a wireless portable telephone in accordance with embodiments 7 and 8.

FIG. 6 is a flowchart illustrating the action of a wireless portable telephone according to preferred embodiment 7.

Upon the generation of a demand for line connection, the base station sends out a page message 21 to a wireless portable telephone. In the conventional manner, the wireless portable telephone in step S6-1 monitors at all times page messages 21 from the base station and judges whether a page messages 21 addressed to its own station has been received or not.

If it is judged in step S6-1 that a page message 21 addressed to its own station has been received, the processing advances to step S6-2 for judging whether or not the antenna is retracted.

Providing that it is judged in step S6-2 that the antenna is retracted, the processing proceeds to step S6-3 for generating a predetermined warning tone. After this generation of the warning tone in step S6-3, the wireless portable telephone executes a call-in processing.

A feature of embodiment 7 lies in the check on whether the antenna is retracted or not when a page message from the base station has been received, whereupon if so, a warning tone is generated. Although in the above embodiments 1 to 6 the warning tone was allowed to be generated only when a predetermined error has occurred, the embodiment 7 generates a warning tone merely on condition that the antenna is retracted. Accordingly, even though a data transmission error has not yet been detected, a warning tone will be generated as long as the antenna is retracted, thus allowing the user to draw out the antenna in advance. This will ensure an effect that the data transmission error can be prevented from occurring.

Embodiment 8

It will be appreciated that the warning tone generated in the step S6-3 of the above embodiment 7 may be substituted by the display processing indicating the state of the antenna being either retracted or drawn out. This will ensure the same function and effect as those of the above embodiment 2, 4 and 6.

According to the present invention, as described above, a wireless portable telephone is implemented in which warning means generates a warning when a data transmission has failed whereby the user can be easily informed of the occurrence of a data transmission error.

According to the present invention, there is provided a wireless portable telephone in which a warning is generated only when the data transmission has failed with the antenna section being retracted, whereupon the user can receive a warning only in the case where the user is capable of actually coping with it.

Also, according to the present invention, upon the reception of a call-in signal, a warning is generated as long as the antenna section is retracted without an error actually being detected. This will enable the user to draw out the antenna before the detection of a predetermined error, whereby a wireless portable telephone capable of preventing a data transmission error can be provided.

Further, according to the present invention, the data transmission is judged to have failed when no response bit appears among a data stream from the base station, thereby ensuring an accurate judgment on whether the data transmission has succeeded or not.

Moreover, according to the present invention, a predetermined warning tone is generated as a warning, whereby the user can recognize the warning with ease.

Furthermore, according to the present invention, a predetermined warning message is displayed as a warning, so that there can be implemented a wireless portable telephone allowing the user to more accurately recognize the content of the warning.

It is to be understood that those skilled in the art will envisage other modifications within the scope and spirit of the present invention as defined by the claims appended hereto.

What is claimed is:

1. A wireless portable telephone for use in a wireless telephone system, comprising:

means for carrying out a communication transmission and reception sequence with a base station whereby a communication link is established between said wireless telephone and said base station;

data transmission means for carrying out a selected portion of said sequence by data transmission from said wireless telephone to said base station;

data transmission monitor means for detecting whether said data transmission by said data transmission means has succeeded or not in said sequence of establishing a communication link between said wireless telephone and said base station;

an antenna section;

antenna retraction monitor means for detecting whether said antenna section is retracted or not; and warning means for giving warning to a user of said telephone when said data transmission monitor means detects that the data transmission by said data transmission means has failed and said antenna retraction monitor means detects that said antenna section is retracted.

2. A wireless portable telephone according to claim 1, wherein said data transmission monitor means includes:

detection means for judging that the data transmission has failed when no response bit appears among a data stream from a base station within a predetermined period of time after said data transmission means has sent out data.

3. A wireless portable telephone according to claim 1, wherein said warning means includes a warning tone generation means for generating a predetermined warning tone.

4. A wireless portable telephone according to claim 1, wherein said warning means includes a warning message display means for displaying a predetermined warning message.

5. A wireless portable telephone for use in a wireless telephone system having means for carrying out a communication transmission and reception sequence with a base station whereby a communication link is established between said wireless telephone and said base station, comprising:

an antenna section;

antenna retraction monitor means for detecting whether said antenna section is retracted or not; and warning means for giving warning to a user of said telephone when said antenna retraction monitor means detects that said antenna section is retracted upon the reception of a call-in signal.

6. A wireless portable telephone according to claim 5, wherein said warning means includes a warning tone generation means for generating a predetermined warning tone.

7. A wireless portable telephone according to claim 5, wherein said warning means includes a warning message display means for displaying a predetermined warning message.

* * * * *